Patented Dec. 5, 1933

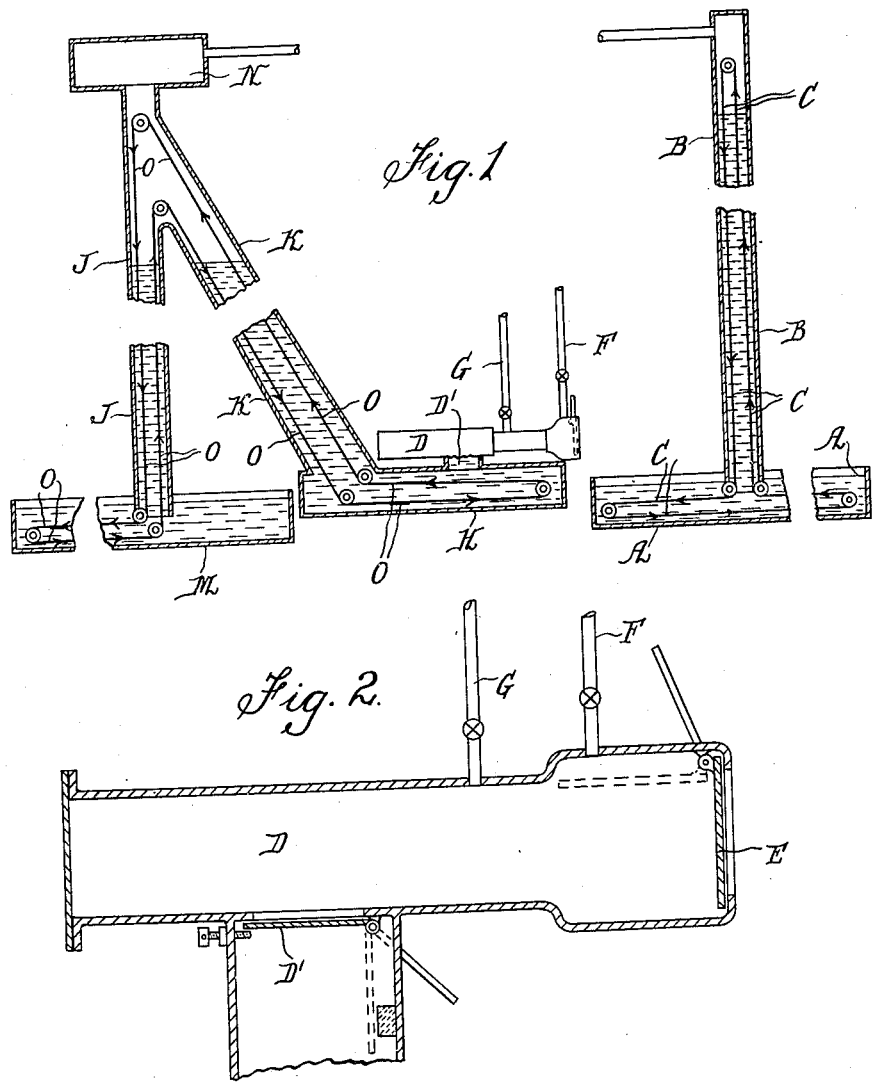

1,938,060

UNITED STATES PATENT OFFICE 1,938,060

PROCESS FOR THE TREATMENT OF FIBROUS PLANTS FOR THE RECOVERY OF THE FIBERS THEREOF

Bernard Bedingfield Wood, Christchurch, New Zealand

Application September 14, 1932, Serial No. 633,183, and in New Zealand October 12, 1931

3 Claims. (Cl. 92—1)

This invention has been devised with the object of providing a new process for the treatment of fibrous or fiber containing growths, such as flax, sisal, jute, and the like in order that the fiber contents thereof may be separated and recovered.

The process devised depends for its operation upon the fact that in the natural make up of the stems or leaves of these fibrous plants there are present a large number of cells, generally containing air or moisture, disposed throughout the body thereof and within its cuticle or covering of vegetable matter. It provides that these cells, when charged with moisture, shall be caused to explode under such force and circumstances as to shatter the formation of the material and thereby to cause the fibers to be freed from the vegetable matter through the blowing off of such matter therefrom.

The process consists, as to its essential part, in the submission of the material with its cells laden with moisture and while in an enclosed space, to the action of heat, under pressure conditions such as to prevent the conversion of the moisture into steam, and then to the sudden release of the pressure by the opening up of the container so that the material is blown therefrom and at the same time the moisture in the cells is converted into steam, the pressure of which conforms to the temperature acquired during heating whilst under pressure, which by its sudden expansion, causes the material to be exploded or shattered and the fibers thereby freed from the remaining matter.

The invention also provides for the said cells being first charged with water, should the growths in their natural condition be deficient in moisture content, and for this purpose embodies the initial subjection of the growths to immersion in water, under vacuum conditions that cause the cells to be exhausted of their air or vapour contents, and then by the breaking of the vacuum to cause the water to enter and fill the said cells. With the object of softening the leaves and (or) preventing darkening of the fiber, approved chemicals well known in the arts, may be added to the water.

If desired, the growths may be subjected to the action of pressure rollers or other like bruising means before being placed in the said water in order to render them more readily absorbent of the water.

The shattered growths, or the separated fibers, are caught after expulsion from the enclosure, in any approved water containing receptacles for washing and final treatment of known natures. It has, however, been found that it is preferable in some cases to discharge the fibers into the water without contact with the atmosphere in order thus to prevent oxidization of the fiber and resultant bad colouring thereof. Such discharge therefore may be made into an enclosure in which vacuum conditions are maintained, the fiber being subjected to the washing operation while under such vacuum conditions, and finally being delivered to the open.

The apparatus employed for carrying out these operations may be of any suitable design, and may be varied to suit any special circumstances. In the accompanying drawing there is shown in diagrammatic manner, a combination of means devised to provide for a continuous sequence of operations upon the material being treated.

In this drawing:—

Figure 1 is a general view of the whole of the apparatus, and

Figure 2 a longitudinal section of a suitable form of container for the combined heat and pressure treatment.

In the use of this apparatus the said material is first carried through a water bath maintained under vacuum conditions and is delivered again to the open. It is then transferred into the combined pressure and heating container for the aforesaid treatment therein, and is discharged from such into a water bath under vacuum conditions, and is finally delivered from such into the open.

The said means comprise an open topped water trough A of approved length with which there is combined a vertically extending column chamber B that opens at its bottom into the said trough, beneath the water level therein, and is closed at its upper end. This chamber has its closed upper end connected with an exhauster so that a vacuum may be produced therein and it is made of the necessary height to provide for the column of water being maintained within it and also for the vacuum space in its upper end. A continuous conveyor C is mounted to pass from one end of the trough A, beneath the water level, up through the chamber B to its upper end, then down again through the chamber and then along to the other end of the trough.

The material for treatment is designed by being placed on this conveyor to be carried along within the trough, and then up through the column B into the upper vacuum end thereof, so as thus to be exhausted of air or vapour, and then to pass down again through the water to have its exhausted cells filled with the water and finally to pass along to the other end of the open trough where it is removed from the conveyor in a water soaked condition. As previously mentioned, this water may contain a chemical solution of approved nature.

A horizontal cylindrical container D is provided to receive the material for the next step in the process. This is made of any approved size to suit the circumstances and of a strength to stand the internal pressure to which it is subjected. It is provided with a charging door E at one end that is capable of being tightly sealed and in its wall, at about half way in its length, is provided with a discharging door D' that is made to be adapted to quickly and fully open when operated. In this cylinder a supply of the water soaked material is placed and sealed. Pressure and heat combined are then introduced into the container through the connection F from a suitable source such being maintained until the temperature of the liquid in the material is raised to the degree such that on the sudden release of the pressure, the liquid will immediately be converted into steam. Such release is then effected by the quick opening of the discharge door D', causing the material to be blown through the door opening into the atmosphere, or into a vacuum sphere, as the case may be, simultaneously with the conversion of the liquid into steam and the shattering of the material as the steam bursts from the cells.

The container D may, if desired, be connected through the valve controlled connection G, with the air and vapour exhausting means employed in the system. This is for the purpose of exhausting air and vapour from the container after it has been charged with the material to be treated therein, and prior to the introduction of the combined heat and pressure.

When the container D discharges into vacuum, it has combined with it an enclosed chamber H into the top of which the discharge opening of the container enters. This is combined with a vacuum column J through a branch K leading from the top of the chamber H, near one end, up into such column. The said chamber and this branch K are charged with water, as is also the column J, which opens at its lower end into an open trough M and at its upper end is made with a vacuum retaining dome N that is connected with the air and vapour exhausting means of the plant.

An endless travelling conveyor O is provided to pass along beneath the discharge opening D' and then up through the branch K into the top of the column J and then down through such column and out along within the trough M, returning in a reverse direction. This conveyor is designed to catch the fibrous material expelled from the container and to carry it along through the water in the chamber and in the branch K and then down through the column J and finally into the trough M, from whence it may be removed. In such travel therefore the fibers remain under vacuum conditions while being washed.

The said branch K and its column J are made of such a height that the water level maintained therein by the vacuum action will be such as to provide for the surging of the level which will take place on the release of pressure from the container D on the opening thereof, the vacuum dome space N also being of such an area as to ensure of the vacuum being maintained on such release, at sufficient degree to prevent any entry of the atmosphere.

As previously mentioned, if the growths being treated naturally contain sufficient moisture, they will not be required to pass through the first vacuum column, but may merely be washed or soaked in a water bath, such bath if desired, containing the chemicals referred to. Also in some cases the material may be discharged from the container D directly into an ordinary bath for washing the fiber free from the vegetable and other colouring matters with which it may be associated.

It will be readily understood that the apparatus employed for carrying out the several steps in the hereinbefore described process may be varied in a large number of ways without departing from the spirit of the invention. It is to be understood therefore that the invention is not limited to the apparatus shown in the drawing and as described herein.

I claim:—

1. A process for the separation of the fibers of fibrous plants, comprising treating the fibrous material first by subjecting it to a vacuum action while immersed in water and then breaking the vacuum to impregnate the material with water, subjecting the material while still impregnated with water to the action of heat in an enclosure under pressure, and then releasing the pressure to cause the moisture to burst into steam.

2. In a process for the separation of the fibers of fibrous plants according to claim 1, the employment of water containing chemicals in solution, for the impregnation of the said material.

3. A process for the separation of the fibers of fibrous plants, comprising treating the fibrous material first by subjecting it to a vacuum action while immersed in water and then breaking the vacuum to impregnate the material with water, subjecting the material while still impregnated with water to the action of heat in an enclosure under pressure, then releasing the pressure to cause the moisture to burst into steam, and finally expelling the material from said enclosure into washing water contained in an evacuated space.

BERNARD BEDINGFIELD WOOD.